United States Patent
Franzen et al.

(10) Patent No.: US 10,669,203 B2
(45) Date of Patent: Jun. 2, 2020

(54) SYSTEM AND METHOD FOR MANUFACTURING ASPHALT PRODUCTS WITH RECYCLED ASPHALT SHINGLES

(71) Applicant: Heritage Environmental Services, LLC, Indianapolis, IN (US)

(72) Inventors: Michael R. Franzen, Lombard, IL (US); David Charles Trumbore, Chicago, IL (US); Laurand H. Lewandowski, Newark, OH (US); Herb Wissel, Indianapolis, IN (US); James E. Burkett, Perrysburg, OH (US); Barry Garriett Hornbacher, Toledo, OH (US); Christian Peregrine, Indianapolis, IN (US); Anthony Kriech, Indianapolis, IN (US)

(73) Assignee: Heritage Environmental Services, LLC, Indianapolis, IN (US)

( * ) Notice: Subject to any disclaimer, the term of this patent is extended or adjusted under 35 U.S.C. 154(b) by 0 days.

(21) Appl. No.: 15/248,886

(22) Filed: Aug. 26, 2016

(65) Prior Publication Data
US 2016/0362339 A1   Dec. 15, 2016

Related U.S. Application Data

(63) Continuation of application No. 13/833,091, filed on Mar. 15, 2013, now abandoned.
(Continued)

(51) Int. Cl.
*B02C 19/00* (2006.01)
*C04B 26/00* (2006.01)
(Continued)

(52) U.S. Cl.
CPC .......... *C04B 26/26* (2013.01); *B02C 19/0056* (2013.01); *C04B 26/006* (2013.01);
(Continued)

(58) Field of Classification Search
None
See application file for complete search history.

(56) References Cited

U.S. PATENT DOCUMENTS 3,458,144 A   7/1969 Lessells et al.
4,145,322 A   3/1979 Maldonado et al.
(Continued)

OTHER PUBLICATIONS

Correspondence from Bourque firm dated May 13, 2014, 2 pages.
(Continued)

*Primary Examiner* — Colin W. Slifka
(74) *Attorney, Agent, or Firm* — Woodard, Emhardt, Henry, Reeves & Wagner, LLP

(57) ABSTRACT

A method for manufacturing a processed asphalt suspension is provided. The method includes dry grinding shingle waste material to a particle size of less than 1 cm, forming ground recycled shingle material, introducing virgin asphalt into a heated slurry tank and mixing the ground recycled shingle material with the virgin asphalt in the heated slurry tank, forming a mixed asphalt slurry, introducing the mixed asphalt slurry into a wet grinding machine, and recovering a processed asphalt suspension comprising particles having a size no greater than about 200 microns. Roofing and paving products manufactured from the processed asphalt suspension are also provided.

17 Claims, 7 Drawing Sheets

Related U.S. Application Data

(60) Provisional application No. 61/671,742, filed on Jul. 15, 2012, provisional application No. 61/728,891, filed on Nov. 21, 2012.

(51) Int. Cl.

| | | |
|---|---|---|
| *C04B 26/26* | (2006.01) | |
| *C08L 95/00* | (2006.01) | |
| *C10C 3/00* | (2006.01) | |
| *E04D 1/20* | (2006.01) | |
| *E04D 5/06* | (2006.01) | |
| *C04B 111/00* | (2006.01) | |
| *E01C 7/22* | (2006.01) | |

(52) U.S. Cl.
CPC .............. *C08L 95/00* (2013.01); *C10C 3/007* (2013.01); *E04D 1/20* (2013.01); *E04D 5/06* (2013.01); *C04B 2111/0075* (2013.01); *C04B 2111/00586* (2013.01); *C08L 2555/22* (2013.01); *C08L 2555/34* (2013.01); *C08L 2555/52* (2013.01); *E01C 7/22* (2013.01); *Y02A 30/333* (2018.01)

(56) References Cited

U.S. PATENT DOCUMENTS

| | | | |
|---|---|---|---|
| 5,337,965 A * | 8/1994 | Chiovitti | B03B 9/065 |
| | | | 208/39 |
| 5,464,163 A | 11/1995 | Zoz | |
| 5,848,755 A | 12/1998 | Zickell et al. | |
| 5,938,130 A | 8/1999 | Zickell | |
| 6,120,838 A | 9/2000 | Zickell | |
| 6,228,503 B1 | 5/2001 | Zickell | |
| 6,290,152 B1 | 9/2001 | Zickell | |
| 6,972,047 B2 | 12/2005 | Butler et al. | |
| 8,496,196 B2 | 7/2013 | Zickell et al. | |
| 2007/0213418 A1 | 9/2007 | Vermilion et al. | |
| 2007/0282039 A1 | 12/2007 | Smith et al. | |
| 2008/0184661 A1* | 8/2008 | Lombard | C08J 3/02 |
| | | | 52/745.19 |
| 2010/0129667 A1 | 5/2010 | Kalkanoglu et al. | |
| 2011/0049275 A1 | 3/2011 | Zickell et al. | |
| 2013/0220175 A1 | 8/2013 | Zickell | |
| 2014/0034762 A1 | 2/2014 | Zickell et al. | |

OTHER PUBLICATIONS

U.S. Office Action from corresponding U.S. Appl. No. 13/833,091 dated Jan. 8, 2015 (8 pages).

U.S. Final Office Action from corresponding U.S. Appl. No. 13/833,091 dated Sep. 24, 2015 (11 pages).

\* cited by examiner

SYSTEM AND METHOD FOR MANUFACTURING ASPHALT PRODUCTS WITH RECYCLED ASPHALT SHINGLES

BACKGROUND

This non-provisional utility patent application is a continuation application of U.S. Non-Provisional patent Application Ser. No. 13/833,091, filed Mar. 15, 2013 to which priority is claimed under 35 U.S.C. § 120 and which is based upon and claims priority under 35 U.S.C. § 120 to U.S. Provisional Patent Application Ser. No. 61/671,742 filed on Jul. 15, 2012 and to U.S. Provisional Application No. 61/728,891, filed on Nov. 21, 2012, to each of which provisional patent applications priority is hereby claimed under 35 U.S.C. § 120. Each application is hereby expressly incorporated by reference in its entirety.

The present invention relates generally to asphalt products, including processed asphalt compositions, that include recycled shingle material. More particularly the present invention relates to methods and apparatuses for forming processed asphalt suspensions, including mixing systems and process methods for creating performance enhanced asphalt compositions used in asphalt products.

Asphalt roofing shingles make up over two-thirds of the residential roofing market for both new homes and roof replacements. However, the high volume production of asphalt shingles leads to the production of significant waste, not only during the manufacture of the shingles, but also through removal ("tear-off") of used shingles. In fact, it is estimated that 11 million tons of shingle waste is produced each year and approximately 10 million of these tons end up buried in landfills. The waste generated from the asphalt roofing products is concerning, since the shingles themselves do not degrade and stay permanently in the landfill. This and the fact that there is considerable raw material value in the shingles has resulted in significant efforts in recycling all types of roofing materials for a variety of purposes.

U.S. Pat. No. 5,848,755 to Zickell et al. discloses an asphalt roofing material recycling system used to recycle asphalt materials, such as asphalt shingles and tar paper that include granules, fibers or other particles. The asphalt material is simultaneously heated and milled in a heated milling apparatus, such as a heated ball mill, to reduce the size of the asphalt material granules in suspension in liquid asphalt.

U.S. Pat. No. 6,290,152 B1 to Zickell discloses that asphalt material is simultaneously heated and milled in a heated milling apparatus such as a heated ball mill. Excess moisture is removed from the asphalt material by continuously venting the heated ball mill apparatus.

U.S. Patent Application Publication No. 2010/0129667 to Kalkanoglu et al. discloses roofing products that are made from recycled roofing materials. The recycled roofing materials can be processed in an attritor or other media mixer to reduce the size of roofing granules and fibers.

BRIEF SUMMARY

The general inventive concepts are directed to a method for manufacturing roofing products using a processed asphalt suspension. The method includes pre-processing shingle waste material by grinding the material to a first minimum size, forming ground recycled shingle material. The preferred process for preparing the shingles is to dry grind the waste shingles using horizontal or vertical shaft impactors or hammer mills. This minimizes moisture in the ground shingles and allows removal of metallic particles. This ground recycled shingle from either of these processes produces a particle less than 1 cm. The ground recycled shingles are stored in a dry condition until further processing to make a processed asphalt suspension. According to some exemplary embodiments, the ground shingles are processed in a vibratory screen deck or trommel screen to remove the granules and metallic material before being used to make the processed asphalt suspension.

The process of making the processed asphalt suspension may begin with a heated slurry tank. The tank may be partially filled with virgin asphalt with a preferred temperature between 150-260° C. The virgin asphalt is manufactured to produce a processed asphalt suspension with rheological properties appropriate to the end use application. An antifoam agent is optionally added to the top of the mixed virgin asphalt to prevent excessive foaming of the ground shingles from trapped moisture. The ground recycled shingle material may then be added to the slurry tank, forming a mixed asphalt slurry. The ground recycled shingles are added slowly to the slurry tank to control moisture released as steam. The mixer is powerful enough to keep the asphalt material in suspension as any residual trace amounts of water trapped in the ground recycled shingle is released as steam in the vented tank and until the slurry is pumped to the next step in the process. The tank may also be heated to bring the mixed asphalt slurry to the proper temperature of 150-260° C. before pumping to the attritor or ball mill. This embodiment of producing a completely dry processed asphalt prevents foaming of the slurry in the attritor or ball mill from even low (<0.5% moisture) levels of water trapped in the shingles.

The mixed asphalt slurry may then be fed into a wet grinding mill, such as an attritor or stirred vertical or horizontal ball mill. This device reduces the size of mineral matter and agglomerates, including granules or fiberglass, until 90% of the mineral matter or agglomerates is less than about 150 micron in size and 50% is less than about 50 micron in size. This sizing minimizes settlement in transport and storage.

A wide range of virgin asphalts, including un-oxidized, air rectified, and oxidized asphalts as well as asphalt oxidized in the presence of catalyst or asphalts modified by waxes, oils or other additives may be used and are discussed in more detail below. The mixture should spend enough time in the wet grinding machine to not only reduce the size of the mineral particles, but also to fully incorporate the asphalt from the recycled ground shingle material into the virgin asphalt, thereby getting full use of the recycled asphalt as a processed asphalt suspension The foregoing and other objects, features, and advantages of the general inventive concepts will become more readily apparent from a consideration of the detailed description that follows.

BRIEF DESCRIPTION OF THE DRAWINGS

The present invention will be described with reference to the attached drawings which are given as non-limiting examples.

DETAILED DESCRIPTION

Figure 1:
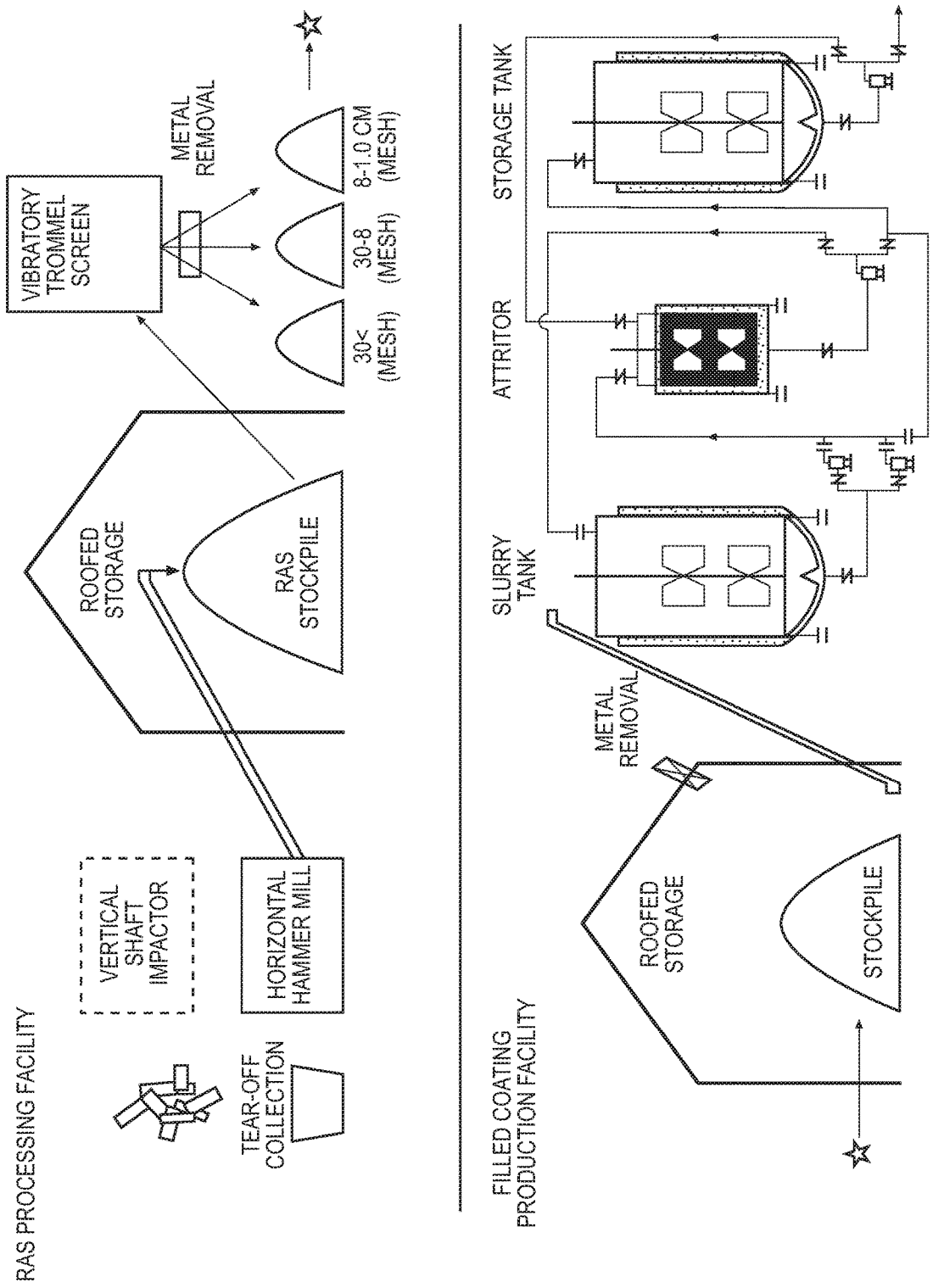
FIG. 1 is a schematic diagram of the processes of producing the ground recycled shingle material and the processed asphalt suspension according to one embodiment of the present invention.

The present invention is directed to methods and apparatuses for producing roofing or paving products using a processed asphalt suspension composition. The present application uses asphalt shingle material that is reduced down to a particle size fine enough to effectively reuse the recycled shingle material. That is, the granules in the asphalt shingles are removed, or they are reduced to a mesh fine enough to be incorporated into newly manufactured products, such as roofing or paving materials, without encountering significant settling of the particles in the manufacturing process, shipment or storage. In some exemplary embodiments, the recycled ground shingle materials are used to produce a processed asphalt suspension that combines virgin asphalt material and recycled shingle material that is tailored to a specific end use. The asphalt in the recycled ground shingle material may be intimately mixed with specially formulated virgin asphalt so that the recycled asphalt may be completely assimilated into the asphalt phase and the final properties of the slurry are optimal for a particular end use. In this application the term "virgin asphalt" refers to asphalt that is not recycled. The intimate mixing brings the aged asphalt back into a useful state.

The term "processed asphalt suspension" refers to a mixture of virgin asphalt and recycled shingles and optionally other materials, such as, for example, oils, waxes, polymers, and/or fine mineral fillers. The asphalt products produced may include any type of asphalt product desired by one skilled in the art, including, but not limited to roofing low slope or steep slope roofing applications as well as paving asphalt binders. Such roofing applications may include hot applied roofing adhesives, modified shingle adhesives, modified bitumen membranes, asphalt coated glass plies and base sheets, asphaltic overlayment protection boards, organic roofing felts, roofing cements, cold adhesives, and mastics. Paving asphalt applications include modified asphalt binders for hot mix asphalt, warm mix asphalt and cold mix asphalt used in constructing roads, parking lots, airfields, or walking paths.

The processed asphalt suspension composition used to produce the processed asphalt products in accordance with the present invention may be formed through a process that blends one or more recycled asphalt materials, such as roofing shingles, that were recovered, such as from old torn off roofs, from manufacturing waste, or both, with virgin asphalt. The virgin asphalts used in this invention may include any variety of vacuum tower bottoms from the distillation of petroleum crude oil and further solvent de- asphalted residua made from those vacuum tower bottoms. Vacuum tower bottoms from re-refining of crankcase oil may also be used.

The virgin asphalts may be used in blends with each other, or the asphalts and blends of asphalts may be oxidized to raise the softening point, as determined according to ASTM D36, and lower the penetration, as determined according to ASTM D5. Catalysts, such as ferric chloride or any form of phosphoric acid, may be used in the oxidation process. Waxes and oils from petroleum or non-petroleum sources may also be incorporated into the virgin asphalt prior to incorporating the virgin asphalt or after manufacturing the processed asphalt suspension. In some exemplary embodiments, the recycled roofing shingles have an asphalt content of from about 15 to 40%, with the remainder of the product being mineral and glass mat or organic felt. Although the asphalt products of the subject invention will be described herein as including ground recycled asphalt shingles ("RAS") as the asphalt additive, it should be appreciated that any asphalt additive may be used in addition to RAS. The method for processing the virgin asphalt and additive together unexpectedly results in enhanced characteristics in the resulting modified asphalt for roofing materials with enhanced durability. In addition, modified asphalt for paving materials, such as binders, showing enhanced and unexpected fatigue properties in the resulting pavement.

Asphalt shingles are generally composed of a filled asphalt (which contains an oxidized roofing asphalt and mineral filler). In some exemplary embodiments, the filler comprises calcium limestone or dolomitic limestone fillers in a ratio of 65% filler 35% shingle coating asphalt. This filled asphalt coats a mat made of materials, such as fiberglass or fabric. On the coated mat, granules of different colors may be placed to give the shingle appearance desired by the homeowner. These colors may be achieved by baking a ceramic coating on the granules, such as, for example, a coating composed of basalt or granite. When the old shingles are removed from the roof at the end of their usefulness they are often mixed with other debris from the tear-off, such as wood, nails and metal (gutters) that may be taken off the roof, as well as paper and plastic from the new roofing shingles packaging which are being placed back onto the roof. The mixed roofing materials from the tear-off should be processed to remove debris before grinding the shingle material.

The asphalt shingles may be ground in a wide variety of different ways, such as, for example, horizontal or vertical impact crushers. According to some exemplary embodiments, the method includes dry processing and avoids any addition of water to the process. The standard grinding process is a one-step process of shredding, grinding or milling asphalt shingles and predominantly generates particles less than 1 cm. In this process, metal particles may be removed magnetically to minimize their presence. According to some exemplary embodiments, the ground shingles from this process break up into three basic particle sizes. The coarse fraction from 1.0 cm to #8 sieve (2380 micron) is comprised primarily of asphalt coated glass or fabric. This fraction is generally the highest in asphalt content. The mid size fraction, #8 mesh (2380 micron) to #30 mesh (595 micron), is primarily ceramic coated granules and is the lowest in asphalt content. The smallest fraction is less than #30 mesh (595 micron) and is comprised primarily of mineral filler and roofing asphalt. The ground recycled shingles can be separated into three sizes at this point using standard screening methods to fractionate the materials to remove different components before further processing if desired. This screening works best when moisture content is <3%.

FIG. 1 illustrates a schematic diagram of an exemplary process of producing processed asphalt suspension according to one embodiment of the invention. As shown in FIG. 1, after the shingle material is ground, the ground or shredded recycled shingle particles may be stored in a dry condition (i.e., <3% moisture), such as under a roof, until used to make the processed asphalt suspension. The process of making the processed asphalt suspension may begin with a slurry tank as illustrated in FIG. 1. The slurry tank may be partially filled with virgin asphalt and heated to a temperature between 150-260° C. The virgin asphalt is manufactured to produce a finished processed asphalt suspension with rheological properties tailored for the end use application desired. An antifoam agent may optionally be added to the top of the mixed virgin asphalt to control foaming of the shingles which contain low levels of trapped moisture. According to some exemplary embodiments, the recycled shingles are added slowly to the heated slurry tank to control the rate of steam release from the asphalt slurry of ground shingles and virgin asphalt. The tank agitation should be effective enough to keep the mixed asphalt slurry in suspension. The tank may be externally heated to prevent buildup on the coils and abrasion from mineral matter while mixing the mixed asphalt slurry. The heating also brings the mixed asphalt slurry to the proper temperature of 150-260° C. before pumping to the attritor or ball mill. This process produces a completely dry mixed asphalt slurry which prevents foaming of the asphalt in the attritor or ball mill from even low (<0.5% moisture) levels of water trapped in the shingles. Drying shingles is often challenging since the shingles tend to agglomerate into large pieces as the shingles are heated above the softening point of the asphalt, making handling as a particulate material difficult.

The mixed asphalt slurry may be fed to a wet grinding mill, such as an attritor or stirred vertical or horizontal ball mill. The term "wet grinding" is defined herein as a grinding process that includes a liquid asphalt component. In some exemplary embodiments, the grinding mill reduces the size of mineral matter including granules, fiberglass, or cellulosic fiber until about 90% is less than 150 micron and about 50% is less than the 50 micron size. This sizing minimizes settlement in transport and storage and assures complete mixing of virgin asphalt and asphalt in the RAS, forming a processed asphalt suspension.

The grinding of the virgin asphalt and RAS may be performed with any wet milling/grinding machine generally known and used in the art. In some embodiments, a grinding mill is used that contains internally agitated grinding media. The grinding material may comprise stirred balls, or otherwise shaped objects. One type of wet grinding mill is an attritor, which consists of a vessel, grinding media, and a mixing arm. The mixing arm may be rotated which agitates the materials and grinding media within the vessel. When the rotating arm is rotated at high speeds, the arm creates mixing in the media, which causes shearing and impact forces on the material inside the vessel. U.S. Pat. No. 5,464,163 to Zoz and U.S. Pat. No. 3,458,144 to Lessells et al. exemplify conventional attritors, incorporated by reference herein. The attritor may be a continuous attritor, wherein the virgin asphalt/RAS material continually moves into and out of the attritor. The attritor not only thoroughly mixes the RAS with the virgin asphalt, but also removes the outer coating on some additive particles, such that during the size reduction, internal components of the additive are exposed and blended homogenously with the virgin asphalt.

Figure 2:
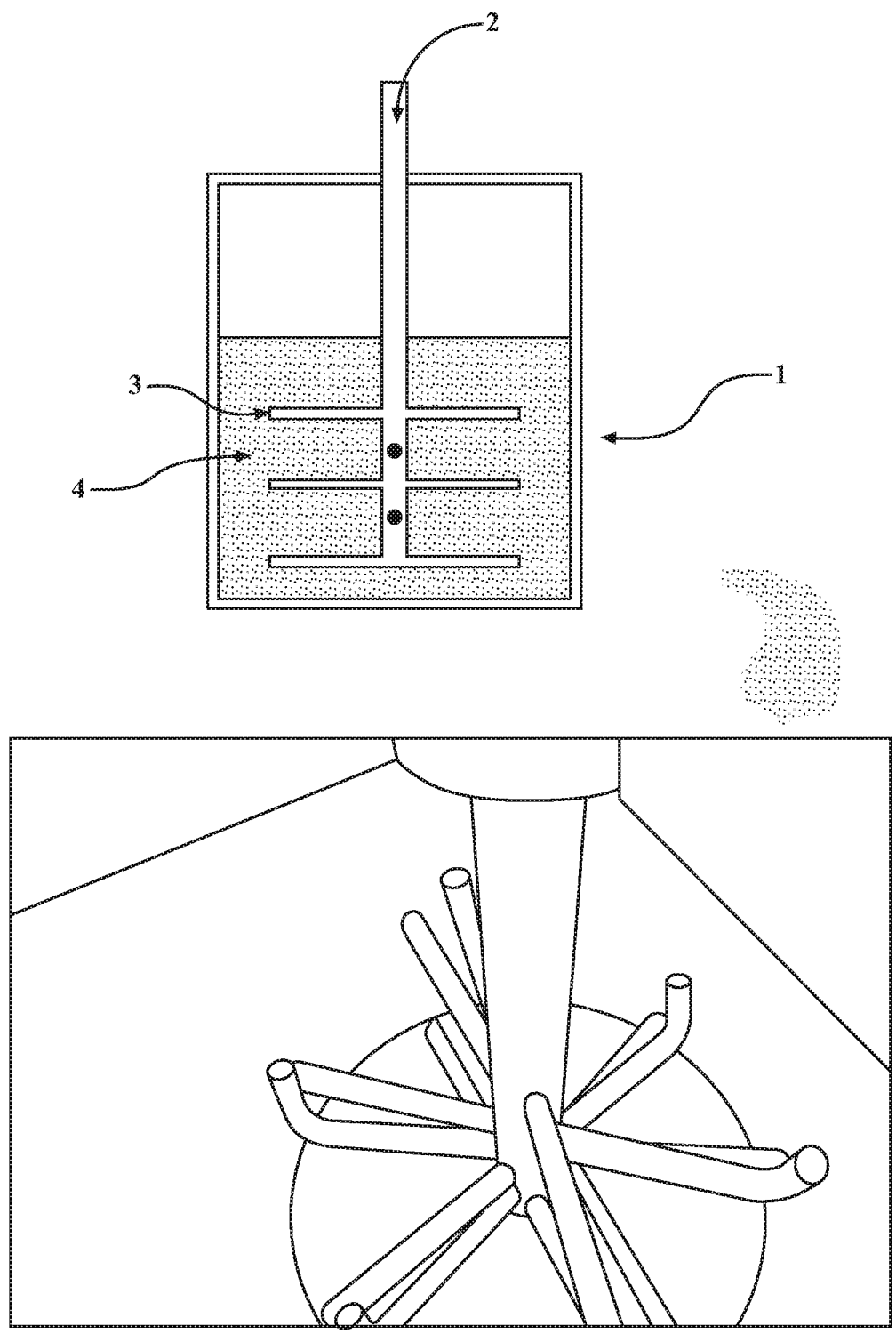
FIG. 2 is a schematic diagram of an exemplary attritor or ball mill.

One exemplary process for recycling shingles and making a processed asphalt suspension is shown in FIG. 2. The attritor includes a vessel 1 which has a heating jacket or other means to heat the contents of the vessel 1 and a mixing bar 2. The attritor, whether batch or continuous, is sized based on desired production rate and the residence time needed for reduction of mineral size and incorporation of the ground recycled shingle asphalt into the virgin asphalt. The exemplary attritor in FIG. 2 is 400 liters in size. In some exemplary embodiments, hot oil may be circulated through a jacket on the vessel in order to keep the mixture at an appropriate viscosity. The mixing bar 2 extends into the vessel which, as depicted, includes a plurality of arms 3 extending outwardly from a central rotatable shaft of the mixing bar 2. The arms extend from different levels of the rotating shaft centered in the vessel. The mixing bar may then be rotated at high speed (about 100 to 1500 rpm), creating shearing and impact forces on the RAS material inside the vessel.

The vessel 1 may include grinding media 4 and, for purposes of the present invention, the grinding media may be preheated together with the mixing bar 2 and walls of the vessel 1. However, other grinding media materials and/or grinding media sizes may be used. The grinding material is agitated within the vessel, causing the inorganic component of the RAS to be ground into very fine particles, such that about 90% of the inorganic component is smaller than 150 microns and about 50% is smaller than 50 microns. Residence time in the attritor may be from about 5 to 10 minutes to higher times depending on the desired properties of the slurry. The final particle size may be tailored to a particular end use product to provide the most valuable filler for the specific product.

In some exemplary embodiments, the resulting processed asphalt suspension comprises very fine particles having a size no greater than about 150 to 200 microns. In some exemplary embodiments, the particles have a size no greater than about 100 microns, and particularly no greater than about 74 microns. Some products may require smaller particles, such as products that have unique rheological properties (i.e., mastics), or products that require a processed asphalt suspension that can withstand storage, shipping, and use at higher temperatures without significant settling of the particles. In some exemplary embodiments, the attritor system that creates the fine particles is a continuous process, in that water-free RAS/asphalt can be continuously pumped into the attritor and the resulting processed asphalt suspension may be continuously pumped from the attritor into a holding tank. The average residence time in the attritor will then be determined by the attritor size and the pump rate. The holding tank may be heated and may include an agitator or recirculation system sufficient to keep the particles in suspension. Alternatively, the processed asphalt suspension may be formed into a solid material by pouring into containers or pelletizing and then shipped to be used either cold or reheated.

In some embodiments, the asphalt comprising the RAS has a softening point between 30 and 110° C. In other exemplary embodiments, the asphalt is from torn off aged shingles and has a softening point of from 95 to 150° C. because of oxidative aging on the roof. The filler may comprise mineral granules, calcium carbonate or dolomite filler, talc or sand back-dusting in varying quantities depending on the source of the asphalt shingles. The RAS may also contain either glass mat or organic felt which have been reduced in size in the initial grinding process.

An exemplary embodiment includes the ability to further process the ground recycled shingles into different size fractions. This can be accomplished using vibratory screen decks to remove granules from the ground shingles. The remaining ground shingle fractions can be recombined to produce a ground recycled shingle material with higher asphalt content and less abrasive granule content. This low granule mixture reduces wear on mixing and grinding equipment from the basaltic granules.

In some exemplary embodiments, the processing steps of the present invention involve incorporating the ground RAS material into molten virgin asphalt, such as, for example, vacuum tower bottoms from petroleum distillation, oxidized vacuum tower bottoms, paving asphalts, oxidized paving asphalts, solvent de-asphalting residua, oxidized solvent de-asphalting residua, re-refined motor oil bottoms or combinations of any of the above, and subjecting the molten virgin asphalt and RAS to a combination of mixing and drying before being ground in a wet grinding mill, for example an attritor, to produce a processed asphalt suspension.

After the processed asphalt suspension has been produced, other additives may be added, such as waxes, polymers, chemicals, etc., such that the final product can be tailored "as needed" in post-processing steps for a particular manufacturing process. Some of these additives can also be added in prior processing steps.

EXAMPLES

Production of Processed Asphalt Suspension

There are three main components in the production of processed asphalt suspension: processing of the RAS input material (FIG. 1), mixing and processing the processed asphalt suspension (FIG. 1), and storage of the processed asphalt suspension (FIG. 1). Each component of the process will be described in the following example.

Processing of the Shingle Input Material

The quality of the shingle input material is critical to the production of the processed asphalt suspension. Quality refers to the amount of debris present, moisture content, and the size of the RAS after grinding and processing.

Debris is defined as the non-shingle materials present due to the tear off process (nails, flashing, wood, packaging for new shingles, etc.). Debris present during the processing is detrimental to the performance of the pumps, hoses, storage tanks, and mills used during the processing; however, minor amounts of debris, such as about 5% may be tolerated. Debris removal is accomplished through the use of magnets placed over conveyer belts in the grinding, sizing and slurry vessel addition processes (FIG. 1) as well as hand sorting to remove wood, plastic, metal and plastic gutter as well as flashing.

Moisture content of the material should generally be less than about 3% to minimize foaming in the asphalt slurry vessel. Tear off shingles are typically delivered to the input processing site in open top roll off containers that are exposed to the weather for some period of time (FIG. 1). The tear off shingles are dumped and placed under roof and sorted to remove debris. The processed shingles are then further processed through a dry grinder or vertical shaft impactor to reduce the size of the agglomerates (FIG. 1). Neither the dry grinder nor vertical shaft impactor uses water and thus are termed dry grinders. Through this dry grinding step RAS input material is reduced to a size less than 1 cm and moisture is further reduced (FIG. 1). Low levels of moisture (<3%) are important to the size separation step.

RAS input material in this example was further separated into sizes. A vibratory screen deck (FIG. 1) was used to separate the material in the current example. Other separation techniques may also be used. A trommel screen is an example of an alternate separation technique. In this example, the material was separated into three sizes: material retained above #8 sieve (2360 microns), material retained above #30 sieve (595 microns) but at the same time smaller than #8 sieve (2360 microns), and material smaller than #30 sieve (595 microns). This sizing is for this example only and many other size splits may be selected as desired for a particular application (FIG. 1).

Mixing of the RAS Processed Asphalt Suspension

A heated slurry tank with vigorous agitation was used for the RAS/asphalt slurry tank (FIG. 1). The slurry tank was filled to about ⅓ of its volume with heated virgin asphalt and agitated. An antifoam agent was added to the virgin asphalt. Exemplary antifoam agents and defoamers that may be used include those which have been used in asphalt applications such as silicones. An equal amount, by weight, of RAS input material (in this example below #30 sieve (595 microns)), was added to the tank. RAS input material was added at a rate such that the base asphalt would not foam over the tank. Foaming may occur due to remaining moisture in the RAS input material. The RAS input material may always have some level of moisture making the rate of addition to the slurry tank an important safety issue, so venting is recommended. The rate of addition also influences the temperature of the slurry. In the present example, the slurry tank was kept at a temperature above 130° C. in order to maintain a viscosity in which the agitator can maintain operation. Once the modified asphalt slurry was produced, the slurry was further agitated and heated to a temperature of 180° C.

Processing the Modified Asphalt Slurry to Make Processed Asphalt Suspension

The RAS slurry was further processed through an agitated ball mill such as an attritor (FIG. 1). In this example, a 400 liter attritor, with a 50 HP motor, was used. The operating capacity of the attritor was approximately 265 liters of asphalt slurried material. The asphalt slurry material was pumped from the slurry tank to the attritor. All lines involved in the system may be hot oil heat traced and insulated. The process for this example was batch, although a continuous process may also be used. The attritor was run for 10 minutes per batch. The attritor shaft speed was 109 rpm, which translates to a tip speed of 4.5 meters/second. After the material was processed in the attritor for 10 minutes it was then pumped into the third component of the system, a storage tank (FIG. 1). The batch capacity and attrition time were chosen to create a processed asphalt suspension with an average particle size of 50 microns or less. The average particle size for the processed asphalt suspension created in this example was 32 microns.

Processed Asphalt Suspension

The resulting processed asphalt suspension may be used for many products in the asphalt roofing and asphalt paving industries. Virgin asphalt and RAS input materials can be combined in different formulations to create desired properties of the final processed asphalt suspension. In the current example, the processed asphalt suspension was formulated to produce an end product with a specific softening point and needle penetration range. During the processing stage, batch formulations were changed by adding more or less virgin asphalt and RAS input material to produce the desired product results. The 19 batches were placed in a finished tank (FIG. 1) with an average softening point of 96° C. and penetration of 14 dmm.

Storage of the Processed Asphalt Suspension

The processed asphalt suspension should be stored properly to avoid settlement of the filler over long periods of time. Storage tanks may be externally heated with mild agitation (FIG. 1). It may be beneficial for tanks to be externally heated because filler in the processed asphalt suspension will deposit on, coat and insulate the internal coils. Filler coating the internal coils causes them to less effectively transfer heat. Light mixing of the processed asphalt suspension keeps filler particles in suspension, providing a homogenous product. The tank was visually inspected after pumping off the processed asphalt. No visible filler was present on the bottom of the tank.

Full Asphalt Utilization and Aging Benefit in Roofing Products

To demonstrate the benefits of mixing recycling shingle material with virgin asphalt, a range of asphalt shingle coating formulations were prepared using aged tear off recycled shingle material smaller than a 20 mesh screen (smaller than 0.033 inches or 841 microns), virgin asphalts made by blowing a blend of asphalts (vacuum tower bottoms made from distilling predominantly Canadian crude oils) and a finely ground calcium carbonate filler. The materials were mixed together at a temperature between 175 and 200° C. in a high speed Ross Mixer to simulate the complete incorporation of recycled and virgin materials in an attritor. The recycled shingle material was added at 0, 15, and 30% levels of virgin asphalt replacement, the virgin asphalt was blown to 88, 95, and 102° C. softening points, and the filler was added so that the final mix had 64, 67 and 69% total inorganic filler content. Softening point data from the resultant formulations in the experimental design is listed below in Table 3.

TABLE 3

| Set Point Number | % Recycle in Coating (% recycle asphalt to virgin asphalt) | Overall Filler (%) | Virgin Asphalt Softening Point (° F.) | Final Coating Softening Point (° F.) |
| --- | --- | --- | --- | --- |
| 1  | 15 | 64 | 190 | 235 |
| 2  | 15 | 69 | 190 | 238 |
| 3  | 0  | 64 | 215 | 241 |
| 4  | 30 | 69 | 190 | 256 |
| 5  | 30 | 64 | 190 | 247 |
| 6  | 0  | 69 | 190 | 224 |
| 7  | 15 | 67 | 203 | 245 |
| 8  | 30 | 64 | 215 | 270 |
| 9  | 0  | 69 | 215 | 250 |
| 10 | 0  | 64 | 190 | 213 |
| 11 | 15 | 64 | 215 | 248 |
| 12 | 30 | 69 | 215 | 270 |
| 13 | 15 | 69 | 215 | 263 |
| 14 | 15 | 67 | 203 | 247 |
| 15 | 0  | 64 | 215 | 239 |
| 16 | 15 | 69 | 190 | 238 |
| 17 | 15 | 64 | 190 | 229 |
| 18 | 15 | 69 | 215 | 261 |
| 19 | 0  | 69 | 190 | 225 |
| 20 | 15 | 64 | 215 | 249 |
| 21 | 30 | 64 | 190 | 244 |
| 22 | 30 | 69 | 215 | 275 |
| 23 | 30 | 69 | 190 | 258 |
| 24 | 0  | 64 | 190 | 216 |
| 25 | 0  | 69 | 215 | 248 |
| 26 | 30 | 64 | 215 | 265 |
| 27 | 30 | 69 | 193 | 242 |
| 28 | 30 | 64 | 193 | 232 |
| 29 | 15 | 69 | 193 | 224 |

Figure 3:
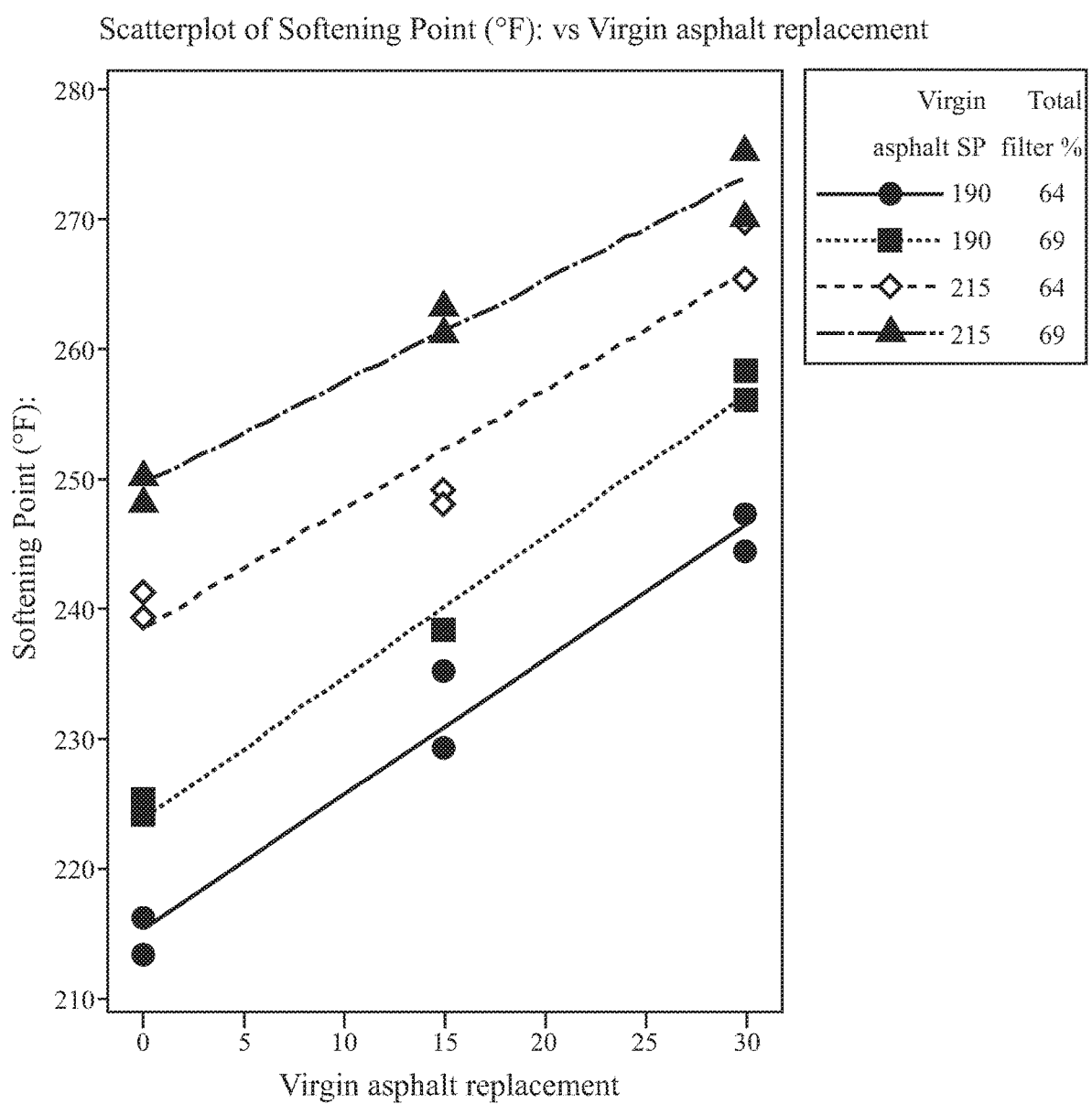
FIG. 3 illustrates a graphical regression analysis that depicts the softening point of the exemplary roofing products made with the processed asphalt suspensions compositions listed in Table 1.

FIG. 3 illustrates a regression analysis that depicts the softening point of the final coating product made with the 29 formulations listed in Table 3, above. The regression analysis presents a linear model with filler %, virgin asphalt softening point, and recycled asphalt content as parameters. The linear equation was as listed below and had an $r^2$ of 98%, indicating that all but 2% of the variation seen in final blend softening point was explained by these three variables.

$SP=63.1+0.853$ Virgin asp $SP+0.954$ Recycle content$+1.83$ Total Filler %

The linear nature of the blend softening point with recycled content (also designated virgin asphalt replacement) indicates that the asphalt in the tear-off shingle is essentially completely incorporated into the virgin asphalt and fully utilized in determining the final product softening point. If that were not the case, the final product softening point would drop below the linear trend line at the higher recycled content values.

Table 4, below, provides data taken to determine the impact of recycled content on durability of the asphalt shingle coating. At the two filler extremes of 64 and 69%, nearly identical product properties were achieved by two formulations: 1) a formulation with no recycled content that used 215° F. (101.67° C.) softening point virgin asphalt, and 2) a formulation that dropped the virgin asphalt softening point to 190° F. (87.78° C.), but added enough recycled shingle material so that 30% of the asphalt was from recycled shingle and 70% was from virgin asphalt. Weathering tests were run per ASTM D4798 using an Atlas Xenon Arc Weatherometer and the average of 4 panels was taken for each set point. The weathering test determines the number of cycles (or days) before product failure, which is determined by cracks in a thin coating of the asphalt material that is subjected to conditions of light, heat, and water exposure.

TABLE 4

| Set Point | Filled Coating Softening Point (° F.) | Filled Coating Durability (average of 4) (cycles to failure) |
| --- | --- | --- |
| 64% filler, 0 recycle, 215 SP virgin asphalt | 240 | 196 |
| 64% filler, 30% recycle, 190 SP virgin asphalt | 245.5 | 227 |
| % diff | 2% | 16% |
| 69% filler, 0 recycle, 215 SP virgin asphalt | 249 | 193.5 |
| 69% filler, 30% recycle, 190 SP virgin asphalt | 257 | 212.5 |
| % diff | 3% | 10% |

As can be seen in Table 4, while the physical properties of the each of the samples were closely matched (softening point within 3%) at each set point, due to the intimate mixing and total incorporation of the recycled asphalt with the lower softening point virgin material, unexpectedly, the durability was higher in both cases by 16 and 10%, which indicates that using the combination of virgin and recycled asphalt to achieve the product softening point is superior in durability to solely using a more highly oxidized virgin asphalt.

Asphalt shingle coating is just used as an example of these properties. Other end products made with these materials would also benefit from both the intimate mixing and use of old and new asphalt and the durability demonstrated by this example.

Example 2

In the following examples, processed asphalt suspension compositions were prepared according to the following method. The RAS was mixed with virgin asphalt in a wetting tank and then transferred to a 400 liter jacketed attritor. The grinding media used in the attritor were 1 cm chrome steel ball bearings. The system was preheated to approximately 175° C. prior to adding the asphalt/RAS mixture. A nitrogen blanket was introduced to prevent oxidation during attriting. The mixing bar was rotated at about 100-150 rpm. The grinding media and the asphalt additive mixture were then mixed for about 5-12 minutes. During this process the grinding media provides shearing and impact forces, which reduce the asphalt additive particle size.

The processed asphalt suspension produced by the present invention is particularly useful for preparing roofing products. As mentioned above, such roofing products may include, but are not limited to, hot roofing adhesive, modified shingle adhesives, modified bitumen membranes, asphalt coated glass plies and base sheets, asphaltic protector board, organic roofing felt, mastics, coatings, and sealants. Each different type of roofing product requires that the production process steps be specifically tailored to the product. Such tailored specifics include, for example, the type and amount of virgin asphalt in the final product and the final particle size of the asphalt filler material. The virgin asphalt may be formulated by the user of the invention and the final particle size is determined by both the initial grinding operation and the choice of attritor operating parameters. Exemplary roofing products are discussed in more detail below.

Hot-applied Roofing Adhesives

One exemplary roofing product that may be produced using the processed asphalt suspension described above includes hot applied roofing adhesives, such as tile adhesives, fleece-backed membrane adhesive, insulation adhesive, etc. The input virgin asphalt may be selected to produce the desired adhesive and flow properties in the final product after it has been fully mixed with the aged asphalt in the tear-off asphalt shingles. It may also be selected to produce an acceptable equiviscous temperature (EVT) allowing quality rooftop application and safe kettle temperatures. Particularly, the hot applied roofing adhesives may have an EVT of less than about 250° C. for mechanical spreaders and 232° C. for mopping, which means that the viscosity is less than about 75 cps at 250° C. and less than about 125 cps at 232° C. The lower the EVT, the fewer problems will be encountered with asphalt fuming, safety issues, and the degradation in asphalt properties, such as reduction in softening point and viscosity, that can occur during high temperature storage or use. In some exemplary embodiments, the particles in the suspension do not settle in the package, transport or kettle stages. The finely divided mineral strengthens the adhesive bond at a low cost. In addition to the asphalt, other additives, such as waxes or oils may be added to further adjust the EVT. In some exemplary embodiments, the product may be sold in bulk or in typical BURA cartons. In other exemplary embodiments, the product may be pelletized and packaged for future use.

The processed asphalt suspension used to form hot applied roofing adhesives typically has about 10 to 60% recycled shingle material and may have an overall solids content of about 6% to 50%. More particularly, the recycled shingle content may be about 40 to 60% and the overall solids content about 28 to 50%. The ability for the processed asphalt suspension composition to avoid settling may be tested according to a modification of the procedure set forth in ASTM D7173, which provides the Standard Practice for Determining the Separation Tendency of Polymer from Polymer Modified Asphalt. According to the standard method, asphalt and polymer blends are poured into cigar tubes and set vertically into an oven at about 162° C. for 48 hours. The method then tests the polymer content in the top and bottom thirds of the tube. To measure these portions of the composition, the tubes were removed after heating and frozen. The tubes were then cut into three equal-size portions and the top and bottom thirds tested for softening point and dynamic shear rheometer, as determined according to AASHTO T315.

The modification used in these examples with the recycled asphalt and virgin asphalt mixes was as follows. The processed asphalt suspension was tested at appropriate temperatures (for example 162° C., 177° C., 204° C., 232° C., and 260° C.) for 48 hours and then the softening point was used as an indicator of inorganic filler content and was tested on the top third and bottom third of the material to look for separation of filler. At 204° C. an acceptable sample shows a difference in softening point of less than 5% from top to bottom. At 232° C. an acceptable sample shows a difference in softening point from top to bottom of less than 10%.

As an example of a specific hot-mopped adhesive formulation: 50% of an ASTM D312 Type 2 BURA asphalt (SP 70° C. to 80° C., needle penetration (ASTM D5) run at 25° C. 18 to 40 dmm) was attritted with 50% of aged recycled asphalt shingle material that had been ground in the enhanced shredding process. The resultant product had the following properties which are consistent with much of the spec for a Type 4 BURA material. Softening point was 104° C., needle penetration run at 25° C. was 14.5, mopping EVT was 232° C. Additionally, the separation was in the range given above as acceptable.

Additive to Modified Bitumen Adhesive

Another exemplary roofing product that may be produced using the processed asphalt suspension includes using it as an additive to polymer modified bitumen adhesives, for example those used in making asphalt shingles. According to some exemplary embodiments, the modified asphalt may be sold in bulk or in packages to manufacturers who would blend it with polymers and possibly other materials, or the product could be manufactured by the processed asphalt suspension producer. The styrene butadiene styrene block polymer (SBS) may be used alone or in combination with other polymers and additives, but other polymer systems may also be used. The processed asphalt suspension brings the benefits of recycled content, a fully incorporated filler which can improve bond strengths, and reuse of a resource of asphalt to act as the continuous phase in the adhesive.

In some exemplary embodiments, the processed asphalt suspension used to produce the polymer modified adhesive may include about 10 to 60% recycled shingle material and may have an overall solids content of about 6 to 50%. Preferably, the processed asphalt suspension includes about 40 to 60% recycled shingle material and an overall solids content of 28 to 50%. The ability for the processed asphalt suspension to avoid settling may be tested according to the modification of ASTM D7173 described above. In some exemplary embodiments, the processed asphalt suspension has a softening point range from about 80° C. to 90° C.

Additive to Polymer-Modified Bitumen Membrane

Other exemplary roofing products that may be produced using the processed asphalt suspension composition includes using it as an additive to polymer modified bitumen membranes, as all or part of the overall asphalt, as all or part of a mixture used to pre-coat the mat prior to final coating, or as all or part of an adhesive added to make the product peel and stick. To produce the aforesaid products, the processed asphalt suspension may be sold in bulk to manufacturers of modified bitumen membranes. Such membranes may include atactic polypropylene polymer (APP) or styrene butadiene styrene block copolymer (SBS). The final product may be applied on the roof with adhesives, hot asphalt, or torches, or the product itself may be a peel and stick membrane. The processed asphalt suspension may be tailored for incorporation into a modified bitumen membrane by carefully selecting a virgin asphalt material to provide the desired product properties, and by grinding the inorganic portion of the recycled material to produce an optimum filler size for the membrane. Issues with damage to glass or polymer mats used in the product from hard filler may be avoided because of the fineness of the filler and also by separation of granules prior to manufacture of the processed asphalt suspension. Additionally, much or all of the mineral filler used in the modified bitumen membranes may be provided in the processed asphalt suspension, thus potentially eliminating a processing step in the membrane manufacture and thereby saving on energy and production time. The processed asphalt suspension may be transported hot in bulk trucks, which is benefited from the lack of product settling.

The processed asphalt suspension used to produce a polymer modified bitumen asphalt or asphalt additive may include about 10 to 60% recycled shingle material and may have an overall solids content of about 6 to 50%. Particularly, the processed asphalt suspension includes about 20 to 60% recycled shingle material and an overall solids content of 15 to 50%. The ability for the processed asphalt suspension to avoid settling may be tested according to the modification of ASTM D7173 described above. In some exemplary embodiments, the processed asphalt suspension has a softening point range from about 38° C. to 66° C.

Additives for Asphalt Coated Plies or Base Sheets

Another exemplary roofing product produced using the subject processed asphalt suspension composition includes additives for the asphalt used in making asphalt coated plies or base sheets used in low slope roofing. As with the modified bitumen discussed above, the filler material may be included in the attritor with the processed asphalt suspension, which creates a very fine filler. The fineness of the filler in the processed asphalt suspension and pre-incorporation in the asphalt enables the filler to be incorporated into standard or enhanced roofing plies with cost benefits and potentially product benefits, such as fire performance and higher filler loadings due to the fineness of the particles in the processed asphalt suspension. Additionally, as mentioned above, the fineness of the particles may also protect the glass mat from damage.

The processed asphalt suspension used to produce the asphalt coating for roofing plies or base sheets may include 10 to 60% recycled shingle material and may have an overall solids content of about 6 to 50%. More specifically the processed asphalt suspension may include 40 to 60% recycled shingle material and may have an overall solids content of 28 to 50%. The ability for the processed asphalt suspension to avoid settling may be tested according to the modification indicated above of the procedure set forth in ASTM D7173. In some exemplary embodiments, the processed asphalt suspension has a softening point range from about 85° C. to 102° C. and a needle penetration at 25° C. of from 10 to 20 dmm.

Roofing Cements, Cold Adhesives, and Mastics

In yet another exemplary embodiments, roofing products produced using the processed asphalt suspension composition include roofing cements, cold adhesives, and mastics. These products are commonly produced from asphalt, solvent, filler, fibers and in some cases polymers. The products may be packaged in pails and applied at ambient temperature. In some exemplary embodiments, the products are thixotropic in nature, which allows for easy application of the products and also the ability for the products to remain in place, once applied. The processed asphalt suspension provides asphalt, filler, and fibers, which are all ingredients normally incorporated in the products, at a low cost. The processed asphalt suspension has the potential to supply part or all of the asphalt and filler used in the system and would supplement the fibers needed. Additionally, the ability to adjust the fineness of the processed asphalt suspension particulate material may benefit the thixotropic nature of the product.

The processed asphalt suspension used to produce roofing cements, cold adhesives, and mastics may include about 10 to 60% recycled shingle material and may have an overall solids content of about 6 to 50%. More specifically, the processed asphalt suspension may include about 40 to 60% recycled shingle material and may have an overall solids content of 28 to 50%. The ability for the processed asphalt suspension composition to avoid settling may be tested as indicated above. The product may be sensitive to settling in the storage and handling of the processed asphalt suspension, although not in the final product. In some exemplary embodiments, the processed asphalt suspension has an SP range from about 38° C. to 66° C., although in other cases higher softening point slurries would be used depending on product formulation.

Example 4

Hot Mix Asphalt Paving Applications

The processed asphalt suspension as described in this present invention can additionally be used to create hot mix asphalt (HMA) pavements. The RAS can be mixed into virgin asphalt at levels between 5 and 65% of the total mixture. In one exemplary embodiment, the processed asphalt suspension contains 50% PG 58-28 with vacuum tower bottoms and 50% RAS. The properties of the processed asphalt suspension are shown in Table 5.

TABLE 5

| Description | 50% PG 58-28 with vacuum tower bottoms 50% RAS |
|---|---|
| Softening Point, ° F. | 135.5 |
| 24 hours Separation Test, ° F. | 0.5 |
| 48 hours Separation Test, ° F. | 2 |
| 25° C. Penetration | 42 |
| Solubility in TCE, % Soluble | 81.49 |
| Brookfield Rotational Viscosity @300° F., PaS | 0.469 |
| Brookfield Rotational Viscosity @325° F., PaS | 0.275 |
| Brookfield Rotational Viscosity @350° F., PaS | 0.150 |
| Original Binder DSR, G*/sin (delta), 76° C., Kpa | 0.96 |
| Original Binder DSR Fail Temp, ° C. | 75.6 |

TABLE 5-continued

| Description | 50% PG 58-28 with vacuum tower bottoms 50% RAS |
|---|---|
| Original Binder DSR Phase Angle @76° C. | 86.7 |
| RTFO Mass Loss, % | −0.321 |
| RTFO Binder DSR, G*/sin (delta), 76° C., Kpa | 3.34 |
| RTFO Binder DSR Fail Temp, ° C. | 79.6 |
| PAV Dynamic Shear, G*sin (delta), 31° C., Kpa | 2955 |
| Creep Stiffness, −12° C., Mpa | 225 |
| m-value, −12° C. | 0.285 |
| Estimated PG | PG 75-20 |
| Actual PG | PG 76-16 |

The data shown above in Table 5 shows complete mixing of the virgin and RAS asphalt based on rheological data under AASHTO M320 Performance Graded Asphalt Binder Specifications (Superpave). The 24 and 48 hour separation tests using ASTM D7173 also shows acceptably low separation from settling of filler. The processed asphalt suspension was used in a 9.5 mm surface HMA design. The mix design used fine recycled asphalt product (RAP) (25.1%), two coarse dolomitic aggregates both with a maximum particle size of 9.5 mm. Coarse aggregate #1 was 25.4% and coarse aggregate #2 was 31.5% of the aggregate weight. A dolomitic stone sand was 16.5% of the aggregate weight. The remaining 1.5% of the aggregate weight is accounted for by the aggregate breakdown during production. The processed asphalt suspension content for the HMA mix was 5.8%. The mix design blend is shown in Table 6.

TABLE 6

| Sieve Size | Percent Passing |
|---|---|
| ½ | 100.0 |
| ⅜ | 96.8 |
| #4 | 66.7 |
| #8 | 37.8 |
| #16 | 24.5 |
| #30 | 16.3 |
| #50 | 10.7 |
| #100 | 8.1 |
| #200 | 7.1 |

Figure 4:
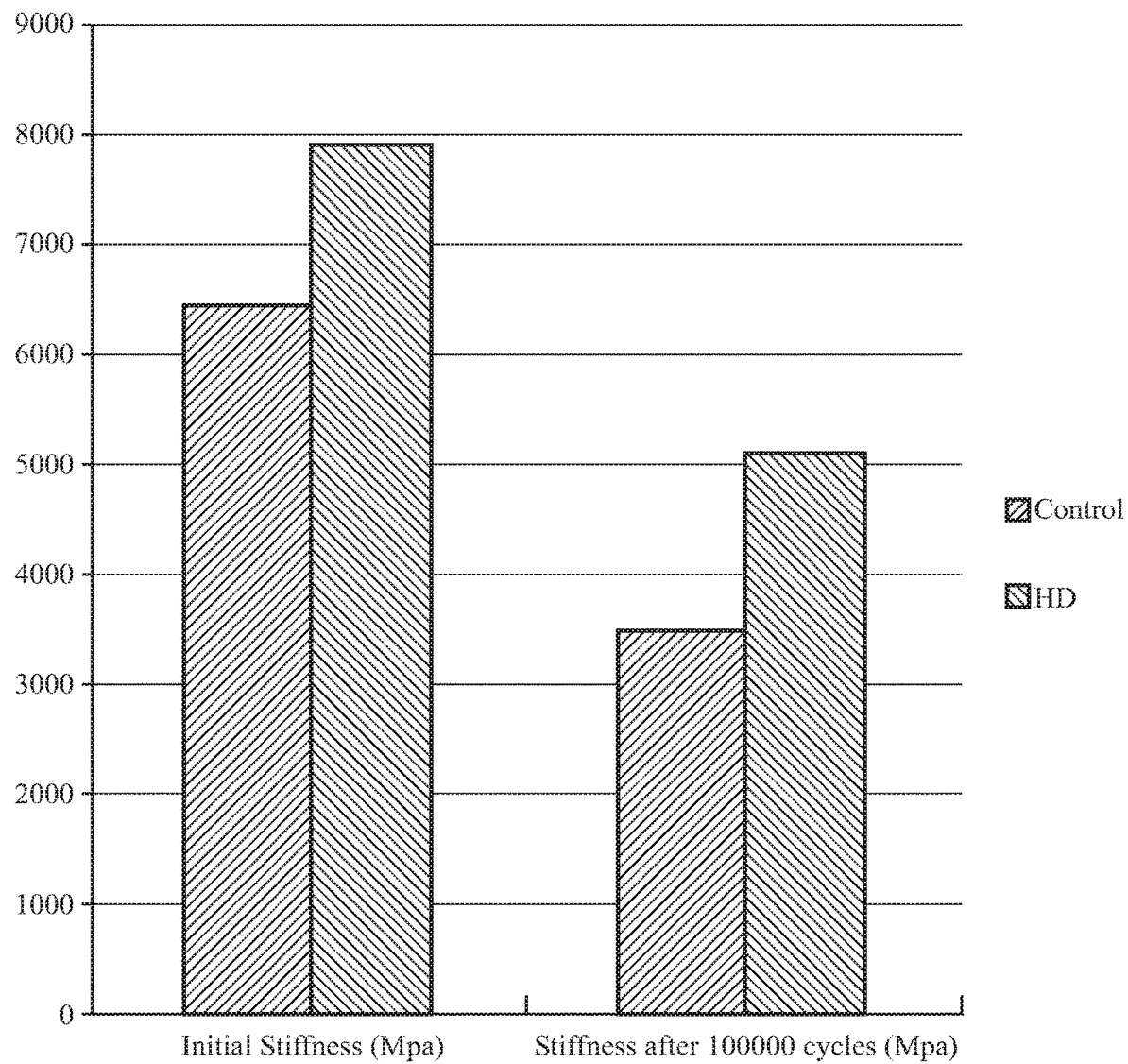
FIG. 4 illustrates the unexpected beam fatigue properties for the processed asphalt suspension in an asphalt concrete beam after 100,000 cycles loading compared to a control pavement without the processed asphalt suspension.

Samples of the plant produced HMA mix were taken from one of the trucks before delivery to the paving site. A control mix was also produced using a similar aggregate structure and a virgin paving grade binder. Both mixes were lab tested for beam fatigue and dynamic modulus (E*). Beam fatigue testing was used to determine how well an HMA performs under repeated traffic loads. If the strain in the HMA is too high, or the stiffness is too low, under repeated loading the pavement may develop fatigue cracking, which will ultimately lead to the pavement raveling and the pavement coming apart. Beam fatigue testing may be performed on lab compacted slabs using either plant produced or lab made HMA. This testing includes cutting several beams to 380 mm long×50 mm thick×63 mm wide from one slab. The beams are then placed in an environmentally controlled chamber. Loads at a specific frequency are imparted at two points near the center of the beam, while the ends of the beam remained fixed. The deflection is measured at the center of the beam. Recording the deflection of the beam allows for the strain to be calculated at a given load, frequency, cycle number, and temperature. The HMA which incorporated the modified asphalt unexpectedly outperformed the control mix. FIG. 4 shows the initial stiffness and the stiffness after 100,000 load cycles of fatigue testing at 20° C. for the mix containing the processed asphalt suspension and the control.

Dynamic modulus is a measure of the strength and load resistance of an HMA pavement. Axial dynamic modulus testing may be performed on lab made specimens with plant made or lab made hot mix asphalt. In one exemplary embodiment, plant or lab produced HMA was compacted in a Superpave gyratory compactor. The compacted HMA was cored and cut to produce a final test specimen that has a 100 mm diameter and was 150 mm tall. Dynamic modulus testing may be performed in a temperature controlled chamber because the temperature of the test specimen during testing is critical when reporting dynamic modulus values. A load was axially applied in a haversine wave frequency until the specimen had been subjected to 100 microstrain. The frequency of the loading directly relates to speed of traffic. The load required to impart 100 microstrain on the specimen was recorded. Using the diameter of the specimen, the load in pounds was converted to stress (kPa). Axial dynamic modulus is defined as the stress divided by the strain at a specific frequency and temperature. Dynamic moduli for the mix containing the processed asphalt suspension and the control mix were measured at a temperature of 30° C. and a loading frequency of 10 Hz.

Figure 5:
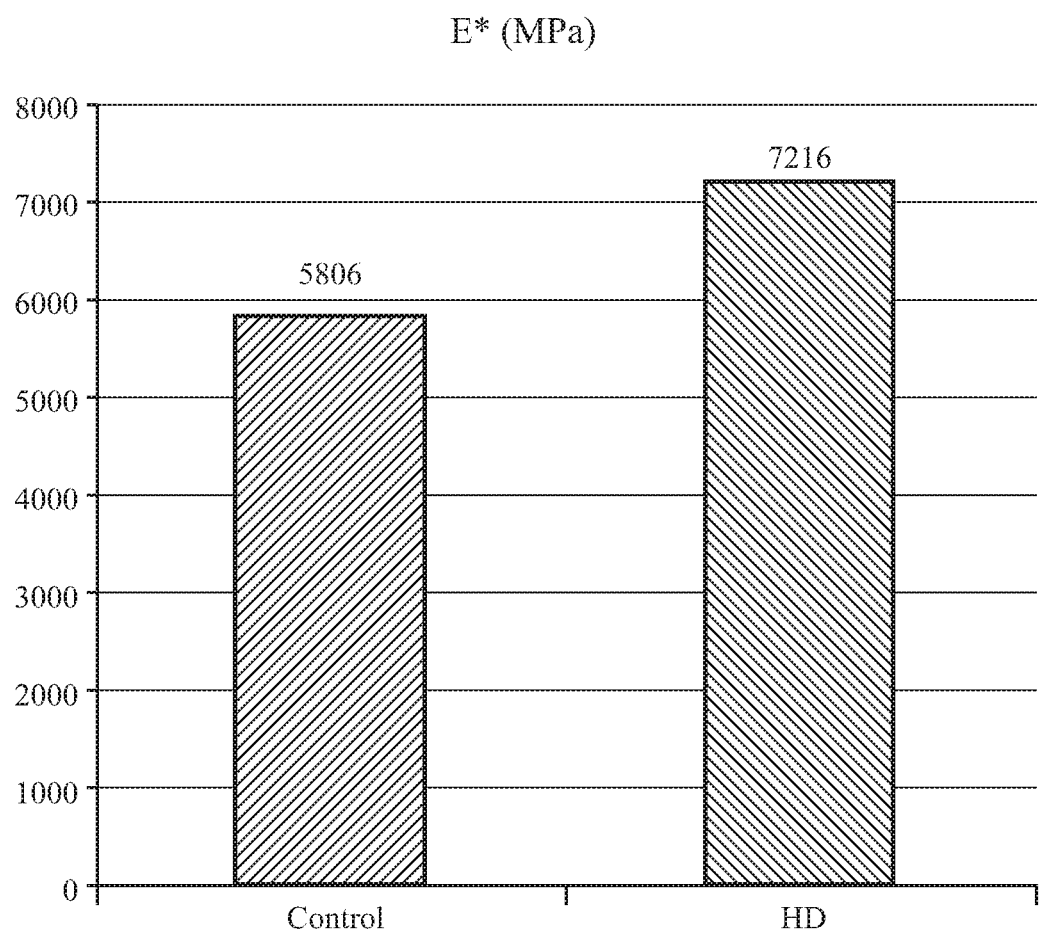
FIG. 5 illustrates the improved dynamic modulus (E*) for an exemplary asphalt concrete mixture containing the processed asphalt suspension in comparison to a straight virgin asphalt mixture.

The results are illustrated in FIG. 5. As illustrated, the processed asphalt suspension mix unexpectedly outperformed the control mix. The performance results for the RAS modified asphalt mix indicate that it will perform as well or better than standard HMA pavements. The use of finely divided fillers provided in the processed asphalt suspension mix show unexpected improvements in both fatigue behavior and dynamic modulus. Both properties are important for rut resistance and durability in pavement systems.

Example 5

Lowered Viscosity

To demonstrate the viscosity lowering benefits of blends where some of the filler comes from the recycled asphalt shingle, two sets of mixes were prepared targeting the same filler levels but with some of the filler coming from the processed asphalt suspension and some of it coming from virgin materials. In these examples, tear off shingles were initially ground to a maximum size of about 450 microns and then attrited in a 50/50 blend with an oxidized asphalt that had a softening point of 74° C. The resultant processed asphalt suspension had a maximum particle size of 100 microns, an asphalt content of 62.5% and a filler content of 37.5%.

Figure 6:
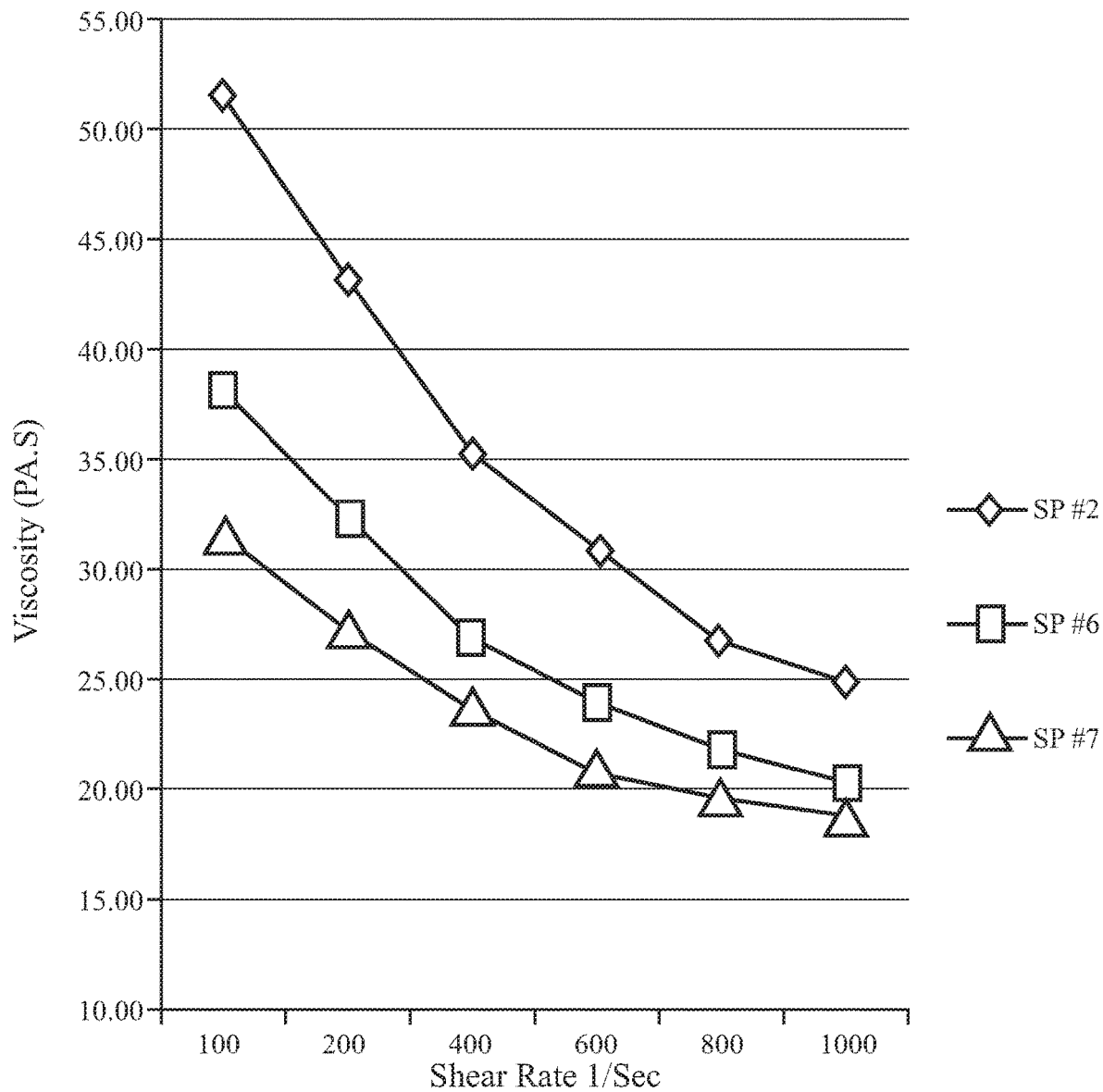
FIG. 6 illustrates the viscosity of exemplary calcite asphalt mixes.

In the first set of mixes, the processed asphalt suspension was blended with varying levels of an asphalt coating (oxidized asphalt with softening point of 101.67° C. (215° F.)) and a virgin calcite filler. Each blend resulted in a filler loading of 65% and an asphalt loading of 35%, but were obtained by using different levels of filler from the processed asphalt suspension. Table 7, below, shows the mix specifics and FIG. 6 illustrates the viscosity as measured by a capillary rheometer, according to the methodology outlined in ASTM D3835. Clearly at the same total filler content the mixes using the processed asphalt suspension had significantly lower viscosity at all shear rates. One possible explanation is that the improved wetting of the recycled filler aids in reducing the viscosity.

TABLE 7

Calcite Asphalt Mixes

| Setpoint | Total Asphalt % | Total filler % | % Virgin Calcite filler | % Recycled Filler | Virgin Asphalt (lb) | Virgin Filler (lb) | Modified Asphalt Slurry (lb) (62.5% asphalt and 37.5% filler) |
|---|---|---|---|---|---|---|---|
| SP #2 | 35.2% | 64.8% | 100% | 0% | 7.6 | 14 | 0 |
| SP #6 | 35.3% | 64.7% | 90% | 10% | 4.2 | 10 | 3 |
| SP #7 | 35.3% | 64.7% | 80% | 20% | 2.6 | 10 | 6.8 |

Figure 7:
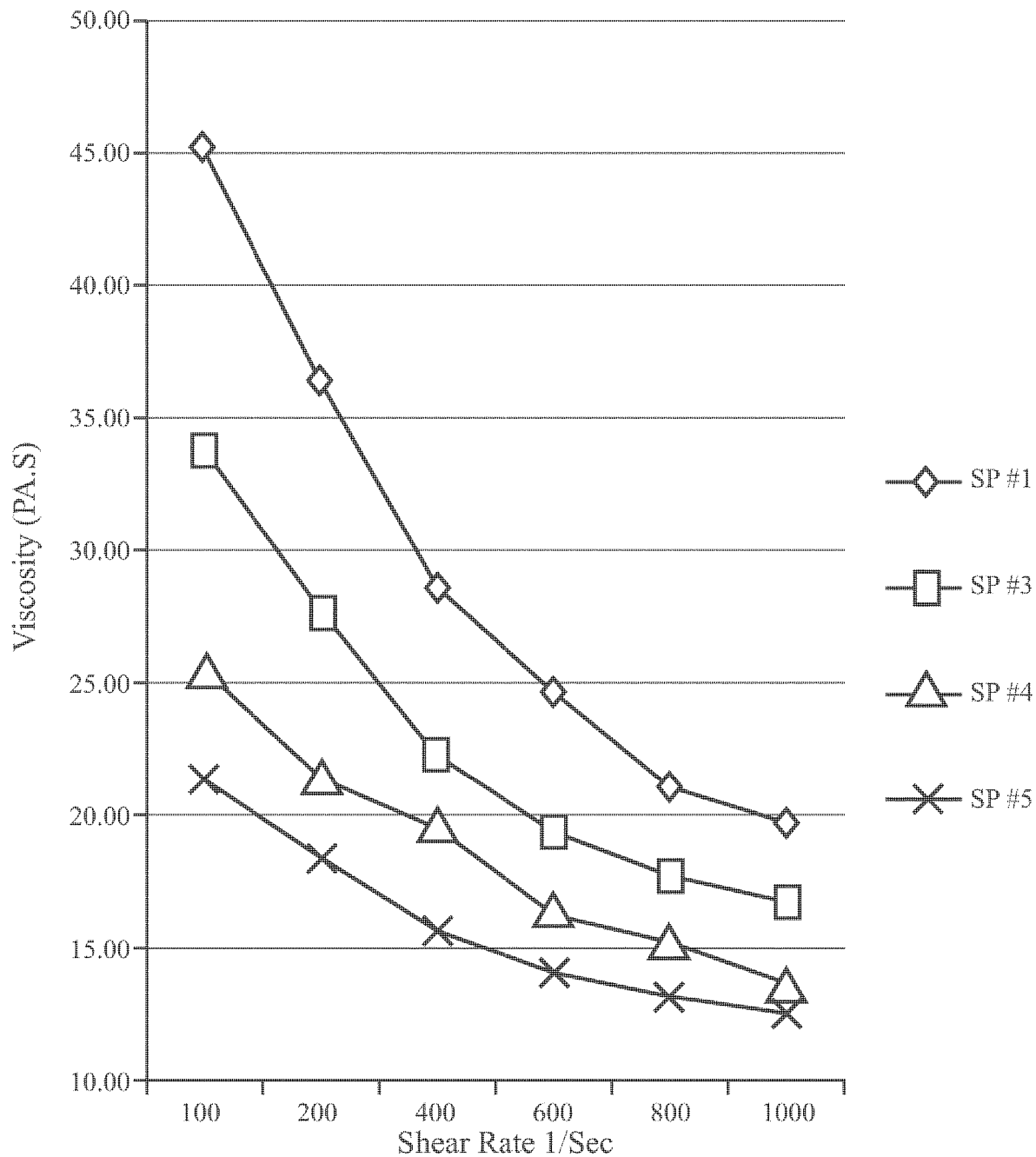
FIG. 7 illustrates the viscosity of exemplary talc asphalt mixes.

In the second set of mixes, talc filler, coating asphalt, and processed asphalt suspension were mixed at different ratios to make mixes with 49% asphalt and 51% filler but with varying levels of processed asphalt suspension in the mix. The mixes are shown in Table 8, below, and the resultant viscosity of the mixes are shown in FIG. 7. The results indicated that once again, the more processed asphalt suspension used, the lower the viscosity. One possible explanation is that the improved wetting of the recycled filler aids in reducing the viscosity.

TABLE 8

Talc Asphalt Mixes

| Setpoint | Total Asphalt % | Total filler % | % Virgin Talc filler | % Recycled Filler | Virgin Asphalt (lb) | Virgin talc Filler (lb) | Modified Asphalt Slurry (lb) (62.5% asphalt and 37.5% filler) |
|---|---|---|---|---|---|---|---|
| SP #1 | 48.7% | 51.3% | 100% | 0% | 7.6 | 8.0 | 0 |
| SP #3 | 49.2% | 50.8% | 90% | 10% | 6.4 | 7.2 | 2.2 |
| SP #4 | 50.2% | 49.8% | 73% | 27% | 4.6 | 6.0 | 5.8 |
| SP #5 | 49.1% | 50.9% | 50% | 50% | 1.0 | 4.0 | 10.8 |

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A method for manufacturing a processed asphalt suspension composition comprising:
    dry grinding a shingle waste material with a vertical shaft impactor to provide a ground shingle waste material, wherein the grinding removes moisture from the shingle waste material;
    removing granules ground shingle waste material to provide a ground recycled shingle material;
    introducing virgin asphalt into a slurry tank heated to a temperature between about 150-260° C.;
    adding the ground recycled shingle feedstock material to said heated slurry tank and mixing said ground recycled shingle feedstock material with said virgin asphalt in said heated slurry tank to form a mixed asphalt slurry;
    processing the mixed asphalt slurry in a wet grinding machine that comprises a stirred ball mill or an attritor to provide a processed asphalt suspension composition; and
    recovering the processed asphalt suspension composition, wherein the processed asphalt suspension composition comprises particles having a size no greater than about 150 microns.

2. A method for manufacturing a processed asphalt suspension composition according to claim 1, wherein the ground recycled shingle feedstock material comprises fine fillers and asphalt.

3. A method for manufacturing a processed asphalt suspension composition according to claim 1, wherein said processed asphalt suspension is comprised of:
    0-100% ground recycled shingle fines and;
    0-100% ground recycled shingle asphalt particles.

4. A method for manufacturing a processed asphalt suspension composition according to claim 1, further including adding an antifoam agent to the virgin asphalt prior to the addition of said ground recycled shingle feedstock.

5. A method for manufacturing a processed asphalt suspension composition according to claim 4, wherein aged asphalt derived from the ground recycled shingle feedstock material is rejuvenated in the wet grinding machine by mixing with the virgin asphalt.

6. A method for manufacturing a processed asphalt suspension composition according to claim 1, wherein additional moisture is removed in the heated slurry tank.

7. A method for manufacturing a processed asphalt suspension composition according to claim 1, wherein the wet grinding machine is an attritor.

8. A method for manufacturing a processed asphalt suspension composition according to claim 1, wherein the processed asphalt suspension comprises particles having a size no greater than about 100 microns.

9. A method for manufacturing a processed asphalt suspension composition according to claim 1, wherein 90% of the particles in the processed asphalt suspension are smaller than 100 microns and 50% of the particles are smaller than 50 microns.

10. A method for manufacturing a processed asphalt suspension composition according to claim 1, wherein the ground recycled shingle feedstock material is derived from ground shingle waste comprising particles that include at least one of granules, fillers, or fiberglass in addition to asphalt.

11. A method for manufacturing a processed asphalt suspension composition according to claim 1, wherein the ground shingle waste comprises granules, and the granules comprise no more than 5% by weight of the processed asphalt suspension.

12. A method for manufacturing a processed asphalt suspension composition according to claim 1, comprising combining together:
 5-65% wt. % of the ground recycled shingle feedstock material component; and
 35-95% wt. % of the virgin asphalt component.

13. A method for manufacturing a processed asphalt suspension composition according to claim 1, further including a step of incorporating an additive into said processed asphalt suspension.

14. A method for manufacturing a processed asphalt suspension composition according to claim 13 wherein the additive comprises at least one of a polymer, a wax, or an oil.

15. A method for manufacturing a processed asphalt suspension composition according to claim 1, wherein said ground recycled shingle feedstock material comprises a powder having no more than 3% moisture content.

16. A method for manufacturing a processed asphalt suspension composition according to claim 1, further comprising manufacturing a roofing product from the processed asphalt suspension.

17. A method for manufacturing a processed asphalt suspension composition according to claim 16, wherein the roofing product includes at least one of hot roofing adhesive, modified shingle adhesive, asphalt shingles, modified bitumen membranes, asphalt coated glass plies and base sheets, asphaltic protector board, organic roofing felt, mastics, coatings, or sealants.

* * * * *